United States Patent
Vargas et al.

(10) Patent No.: US 8,600,457 B2
(45) Date of Patent: Dec. 3, 2013

(54) SLEEP MODE FOR MOBILE COMMUNICATION DEVICE

(75) Inventors: Sandra Irene Vargas, Sammamish, WA (US); Keith Rowe, Seattle, WA (US); Peter Chin, Seattle, WA (US); Anton Andrews, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 11/948,157

(22) Filed: Nov. 30, 2007

(65) Prior Publication Data

US 2009/0143114 A1    Jun. 4, 2009

(51) Int. Cl.
*H04B 1/38* (2006.01)
*H04M 1/725* (2006.01)
*H04M 3/00* (2006.01)

(52) U.S. Cl.
USPC .................. 455/574; 455/412.2; 455/418

(58) Field of Classification Search
USPC ............ 455/574, 566, 567, 412.2, 418, 414.3
See application file for complete search history.

(56) References Cited

U.S. PATENT DOCUMENTS

| | | | | |
|---|---|---|---|---|
| 4,897,869 | A * | 1/1990 | Takahashi | 379/100.06 |
| 6,266,539 | B1 * | 7/2001 | Pardo | 455/556.2 |
| 6,763,105 | B1 | 7/2004 | Miura et al. | |
| 6,937,716 | B2 * | 8/2005 | Lai et al. | 379/373.02 |
| 7,355,928 | B2 * | 4/2008 | Nanda | 368/72 |
| 7,463,556 | B2 * | 12/2008 | Hocherman | 368/74 |
| 7,574,237 | B2 * | 8/2009 | Rolnik et al. | 455/564 |
| 2004/0075700 | A1 | 4/2004 | Liu et al. | |
| 2004/0151076 | A1 * | 8/2004 | Fidel | 368/251 |
| 2004/0264662 | A1 | 12/2004 | Silver | |
| 2005/0014533 | A1 * | 1/2005 | Cave et al. | 455/562.1 |
| 2005/0065822 | A1 | 3/2005 | Ying | |
| 2005/0141677 | A1 | 6/2005 | Hyttinen | |
| 2005/0237862 | A1 | 10/2005 | Choi | |
| 2005/0259641 | A1 | 11/2005 | Beninato | |
| 2006/0014534 | A1 * | 1/2006 | Costa-Requena et al. | 455/432.1 |
| 2006/0105800 | A1 | 5/2006 | Lee | |
| 2006/0106806 | A1 * | 5/2006 | Sperling et al. | 707/10 |
| 2006/0258409 | A1 | 11/2006 | Kogan | |

(Continued)

FOREIGN PATENT DOCUMENTS

| | | |
|---|---|---|
| CN | 1809082 | 7/2006 |
| JP | 2005309751 | 11/2005 |

(Continued)

OTHER PUBLICATIONS iPod Alarm Clock Radio http://www.i4u.com/article3862.html.

(Continued)

*Primary Examiner* — Kent Chang
*Assistant Examiner* — Scott Au
(74) *Attorney, Agent, or Firm* — Vierra Magen Marcus LLP

(57) ABSTRACT

A method and apparatus for operating a mobile communication device in a sleep mode. The mobile communication device displays a time in an easily readable format at a low-light intensity, provides an alert to a user at an alarm time in a particular manner specified by the user, changes the buttons on the mobile communication device to operate as snooze buttons, and suppresses a portion of call and message notifications received by the mobile communication device when the mobile communication device is in the sleep mode. The sleep mode operation is performed, at least in part, according to sleep-mode user settings chosen by the user.

19 Claims, 5 Drawing Sheets

(56) References Cited

U.S. PATENT DOCUMENTS

| | | |
|---|---|---|
| 2006/0280294 A1 | 12/2006 | Zhang |
| 2007/0002533 A1 | 1/2007 | Kogan |
| 2007/0036036 A1* | 2/2007 | Kadish et al. ............ 368/230 |
| 2007/0036154 A1* | 2/2007 | Lipman ................... 370/356 |
| 2007/0037610 A1* | 2/2007 | Logan .................... 455/574 |
| 2007/0080807 A1 | 4/2007 | Kang |
| 2008/0118152 A1* | 5/2008 | Thorn et al. ............. 382/190 |

FOREIGN PATENT DOCUMENTS

| | | |
|---|---|---|
| KR | 10-2005-0087973 | 9/2005 |
| KR | 100764413 B1 | 9/2007 |
| KR | 10-2008-0021375 | 3/2008 |
| WO | 2007069234 | 6/2007 |

OTHER PUBLICATIONS

Luna Docking Station/Radio Alarm Clock http://www.pixmania.co.uk/uk/uk/570584/art/xtrememac/luna-docking-station-radi.html#fichetechnique.

Review GSM phone Samsung Serene or a joint product with Bang &Olufsen http://www.mobile-review.com/review/samsung-e910-serene-en.shtml.

"What is a chumby?" www.chumby.com/story, Sep. 6, 2007.

WolfClock, "Clock with support for backgrounds, personalized tones and songs" http://wolfclock.en.softonic.com/pocket Sep. 6, 2007.

International Search Report & The Written Opinion of the International Searching Authority mailed Mar. 2, 2009, Patent Cooperation Treaty, Application No. PCT/US2008/084729 filed Nov. 25, 2008.

Office Action dated Nov. 13, 2012 in Russian Patent Application No. 2010121867/07.

Response to Office Action filed Nov. 28, 2012 in Russian Patent Application No. 2010121867/07.

Office Action dated Jan. 18, 2013 in Chinese Patent Application No. 200880118640.5.

English translation of Abstract for CN1809082 published Jul. 26, 2006.

English translation of Abstract for JP2005309751 published Nov. 4, 2005.

Voluntary Amendments dated Nov. 3, 2011, Chinese Patent Application No. 200880118640.5.

English translation of amended claims filed in Voluntary Amendments dated Nov. 3, 2011, Chinese Patent Application No. 200880118640.5.

Voluntary Amendments dated Oct. 14, 2011, Japanese Patent Application No. 2010-536137.

English translation of amended claims filed in Voluntary Amendments dated Oct. 14, 2011, Japanese Patent Application No. 2010-536137.

Response to Office Action filed Feb. 4, 2013 in Chinese Patent Application No. 200880118640.5.

Office Action dated Mar. 26, 2013 in Chinese Patent Application No. 200880118640.5.

Response to Office Action filed Apr. 26, 2013 in Chinese Patent Application No. 200880118640.5.

Extended European Search Report dated Mar. 5, 2013 in European Patent Application No. 08854078.6.

Amendment filed Oct. 11, 2013 in European Patent Application No. 08854078.6.

\* cited by examiner

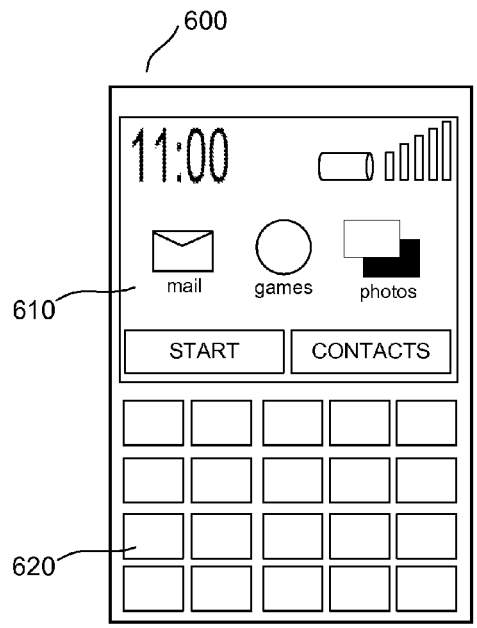
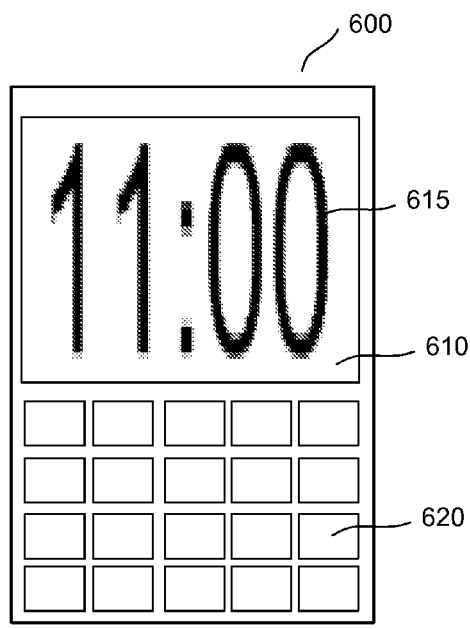
Fig. 4A   Fig. 4B
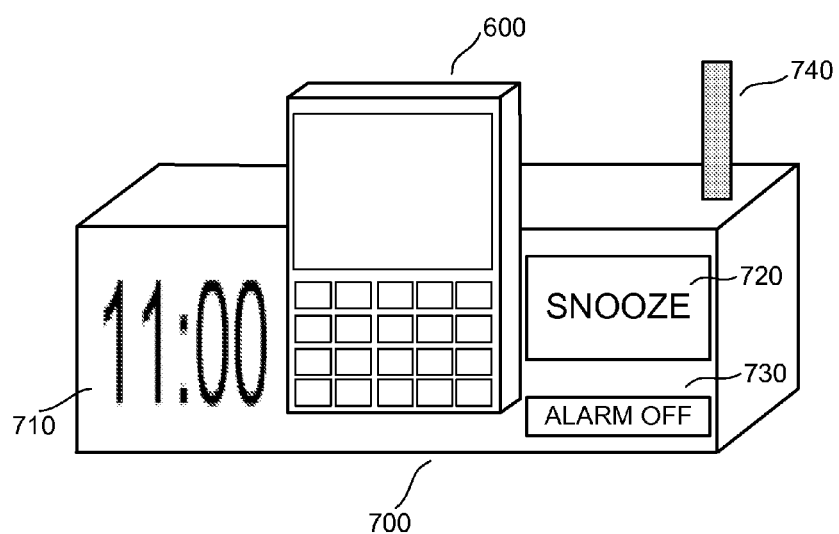
Fig. 5

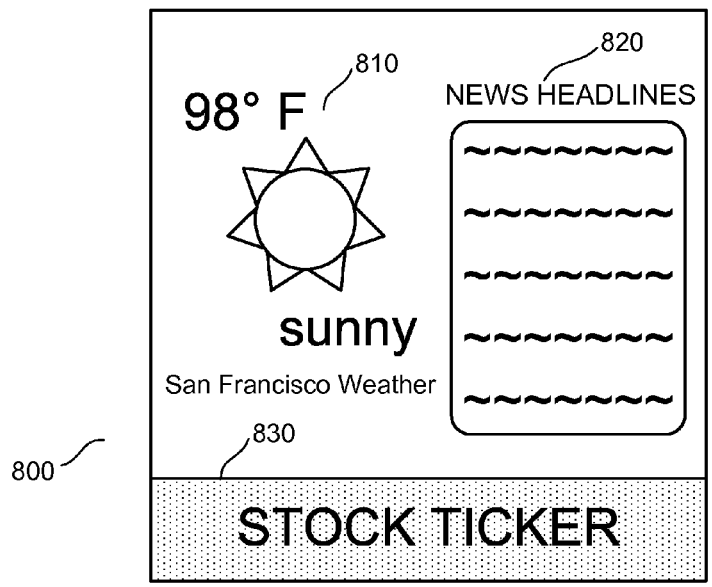

SLEEP MODE FOR MOBILE COMMUNICATION DEVICE

BACKGROUND

Mobile communication device capabilities, such as those of cell phones, have advanced immensely in recent years. Applications that provide email and internet access, calendar and scheduling features, music player capabilities, and synchronization to other devices are just a few of the available features on many cell phones. Due to these advancements, cell phone users have begun to rely more heavily on their cell phones for managing and accessing their contacts, schedules, and other information.

One feature commonly provided in a cell phone is an alarm or reminder feature. However, cell phones generally include relatively unsophisticated implementations of an alarm or reminder. Typically, an alarm clock on a cell phone simply allows a user to set one or more alarms for particular times that the user would like an alert, but the alarm clock setting on most cell phones does very little more than that.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present technology allows a cell phone to operate in a sleep mode based on user-defined sleep-mode settings. The sleep mode feature provides an alert to a user at an alarm time specified by the user. During the sleep mode, the display lighting can be subdued, and the time can be displayed in a format which is enhanced to allow for checking of the time in a dark environment. The buttons on the cell phone can function as snooze buttons, unless the specific alarm-off button is pressed. Furthermore, at least a portion of calls and messages received by the cell phone can be suppressed.

Another aspect of the present technology allows the sleep mode to be triggered automatically when the cell phone is docked in a docking station. The docking station can provide buttons for snooze and alarm-off functionality as well.

Another aspect of the present technology allows the cell phone to install software updates during the sleep mode based on the sleep-mode settings. The present technology also allows the cell phone to synchronize cell phone data with data on another device during the sleep mode based on the sleep-mode settings. This can be performed using communication provided through either the phone or the docking station.

Another aspect of the present technology provides custom data to the user at the alarm time specified by the sleep-mode settings. For example, custom data can include news, traffic, weather, sports, email, stock information, and the like.

BRIEF DESCRIPTION OF THE DRAWINGS

FIG. 4A depicts an example of a cell phone device operating in a communication mode.

FIG. 4B depicts an example of a cell phone device operating in a sleep mode.

FIG. 5 depicts an example of a cell phone device docked in a docking station during a sleep mode.

FIG. 6 depicts an example of sleep mode settings available to a user.

FIG. 7 depicts an example display of custom data provided to a user at a set alarm time.

DETAILED DESCRIPTION

The various aspects of the present technology provide a sleep mode of operation of a mobile communication device. A mobile communication device may comprise a cell phone, a PDA, a smart phone, and the like. For discussion purposes, such devices will be referred to as a cell phone; however, reference to a cell phone encompasses the variety of mobile communication devices.

A cell phone typically operates in what will be referred to as a communication mode. The communication mode encompasses operations normally utilized by a cell phone, including, for example, operation of communication capabilities controlled by the hardware buttons on the device. The communication mode may include sending and receiving calls, text messages, and email. The communication mode includes displaying a menu to access applications on the cell phone and manual access to those applications via the hardware buttons. The communication mode may allow playing music, entering contact information, playing games, and numerous other functions performed through applications on the cell phone.

The sleep mode of the present technology is a mode of operation which transforms the cell phone into a device that is optimized for idle operation, such as when the user is sleeping, for example.

Figure 1:
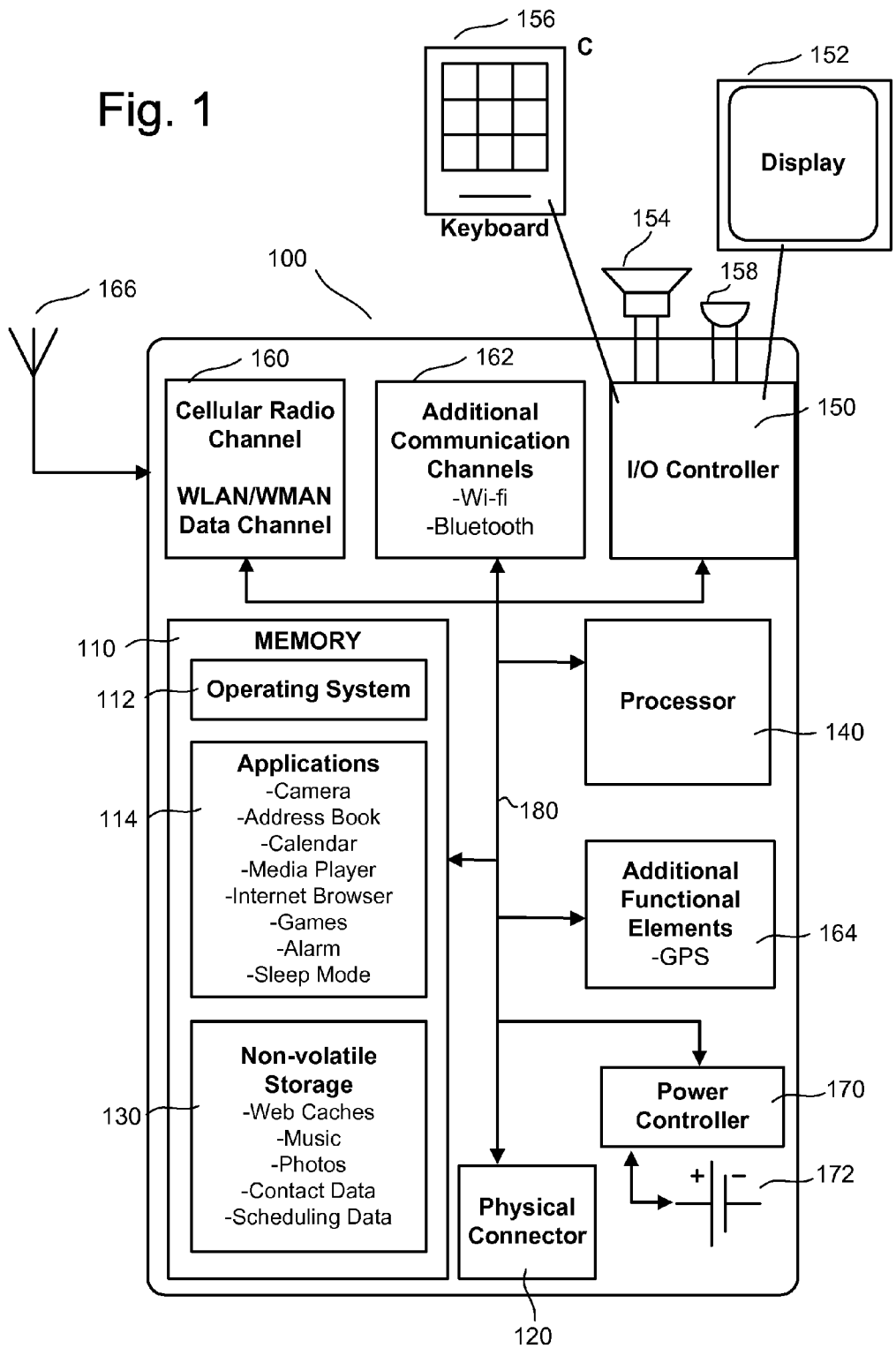
FIG. 1 depicts an example of typical cell phone architecture.

FIG. 1 depicts an example of typical architecture for a cell phone. The cell phone device 100 has memory 110, a physical connector 120, processor 140, an input/output (I/O) controller 150, a cellular radio channel and WLAN/WMAN data channel 160, and power controller 170. Each of these components is connected through the system bus 180 of the cell phone 100.

Memory 110 includes the cell phone's operating system 112, applications 114, and non-volatile storage 130. Memory 110 can be any variety of memory storage media types, including non-volatile and volatile memory. The operating system 112 handles the different operations of the cell phone 100 and may contain user interfaces for operations, such as placing and receiving phone calls, text messaging, checking voicemail, and the like. The applications 114 can be any assortment of programs, such as a camera application for photos and/or videos, an address book application, a calendar application, a media player, an internet browser, games, an alarm application, other third party applications, and the like. The non-volatile storage component 130 in memory 110 contains data such as web caches, music, photos, contact data, scheduling data, and other files.

The operating system 112 manages the hardware of the cell phone 100, including hardware such as the display 152, speaker 154, keyboard 156, and camera 158. The operating system 112 also manages software (i.e. applications 114) on the cell phone 100 for performing tasks requested by the user and handling incoming data, for example. This occurs through the operating system's control and allocation memory (i.e. RAM), system tasks, system resources, files systems, and the like. The processor 140 executes operations for the cell phone according to this control and allocation. For example, a user may attempt to open a video file through a media player application using the keyboard 156 on the cell phone 100. In this case, the operating system 112 may direct the processor 140 to open the desired file stored in the non-volatile storage component 130. During this process, the operating system 112 may also direct the processor 140 to control the operation of other applications concurrently in use, such as an application for receiving calls. Once the file is accessed, the operating system 112 may direct the processor 140 to control the input and output devices using the I/O controller 150 to play the sounds on speaker 154 and images on display 152 for the video file.

The power controller 170 of the cell phone 100 allocates power from the cell phone's power supply 172 to the circuitry for different cell phone components used to operate the cell phone 100 and its different features.

Additionally, the physical connector 120 can be used to connect the cell phone 100 to an external power source, such as an AC adapter or powered docking station. Such a connection can be used to charge the cell phone's power supply 172 via the power controller 170. The physical connector 120 can also be used as a data connection to a computing device. The data connection allows for operations such as synchronizing cell phone data with the computing data on another device.

The cell phone 100 also contains a cellular radio channel and WLAN/WMAN data channel 160 for receiving and transmitting data, such as phone calls, text messages, email, webpage data, and the like. Cellular radio communication can occur through any of the standard network protocols of cell phone communication (i.e. GSM, PCS, D-AMPS, UMTS, and the like.). The cell phone 100 may also contain additional communication channels 162, such as Wi-fi, Bluetooth, and the like, for receiving and transmitting data as well. The cell phone 100 may have additional functional elements for communication 164, such as GPS. Each of the described communication mediums is accessed via the antenna 166 on the cell phone 100. The communication mediums for operations of the cell phone 100 are not limited to the mediums described and can include any other communication mediums known in the art.

Figure 2:
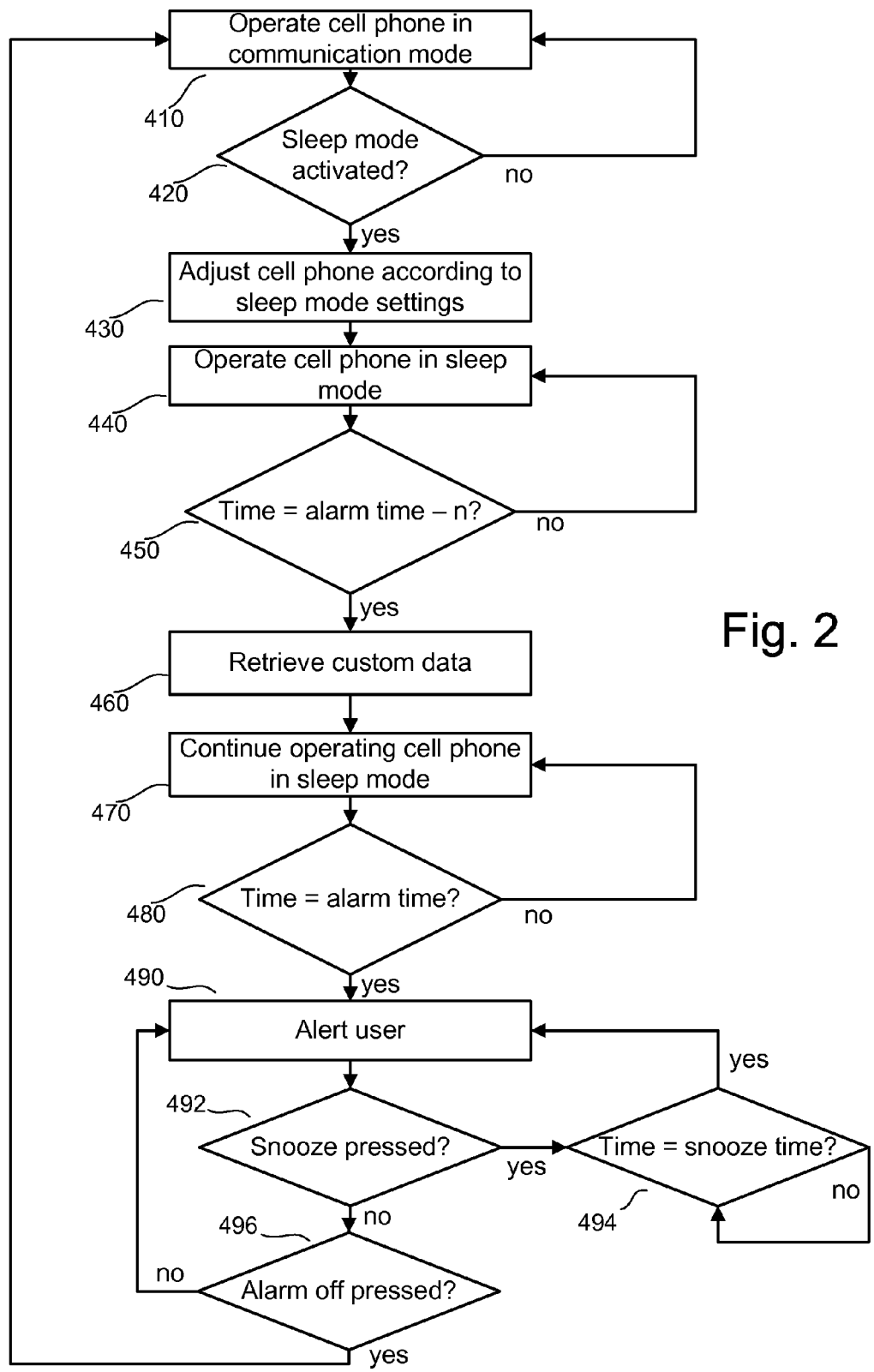
FIG. 2 is a flow chart for one process of operating a cell phone device in a sleep mode.

FIG. 2 depicts a process for operating a cell phone in a sleep mode through a sleep mode application. The sleep mode application can be stored with the collection of applications 114 stored in memory 110. In one implementation, the sleep mode application is a stand-alone application that can be installed on any cell phone device. In another implementation, the sleep mode application is a pre-installed device application that may be included with the cell phone 100.

The sleep mode application allows a user to specify different preferences for operating the cell phone in the sleep mode, such as an alarm time at which the user would like an alert. The user may specify display options, such as how to subdue the display lighting or whether to display a clock during the sleep mode, for example. The user may also specify whether calls should be suppressed during the sleep mode. For example, a notification tone for all calls received during the sleep mode may be set to silent. The user may specify whether the cell phone's hardware buttons should function as snooze buttons when the user is alerted at the specified alarm time. The user may specify whether software updates should be downloaded and installed during the sleep mode. The user may also specify whether the cell phone's data (i.e. contacts, calendars, and the like.) should be synchronized with data on another device during the sleep mode. The user may specify whether to retrieve custom data at the alarm time. The custom data can be offline content received through a data feed. This data feed can be any format typically used to retrieve web content (i.e. RSS, XML, and the like.) The user may specify what type of custom data to retrieve (i.e. new, weather, traffic, and the like.) and whether the custom data should be provided to the user at the alarm time. Each of the preferences for sleep mode settings is described in more detail in the description of FIG. 3.

In one embodiment, a portion of the sleep mode settings for running the cell phone in a sleep mode are default settings for the sleep mode application. Hence, in some embodiments, the default settings may not be provided as options for the user to specify. Instead, they are preset default settings for the sleep mode application.

The sleep mode application may control the input and output devices of the cell phone during the sleep mode based on the sleep mode settings. This includes, but is not limited to, control of the cell phone display, sounds, hardware buttons (i.e. keyboard 156), and the like. In one embodiment, this control can be performed by the I/O controller 150 on the cell phone 100. For example, the display lighting for the cell phone 100 can be controlled by accessing the I/O controller 150.

In one embodiment, the sleep mode application may also access APIs of other applications on the cell phone to initiate sleep mode functions based on the sleep mode settings. For example, the sleep mode application may access APIs in the cell phone's synchronization application to initiate synchronization with another device during the sleep mode if a setting for synchronization is set in the sleep mode settings.

In step 410 of FIG. 2, the cell phone is running in a communication mode. As previously described, the communication mode encompasses the normal operations of the cell phone, including receiving and sending calls, text messaging, playing music, and entering contact information, for example. The cell phone continues to operate in the communication mode unless another mode, such as the sleep mode, is activated.

In step 420, the sleep mode application checks if the sleep mode has been activated. In one embodiment, this can be performed by checking if a sleep mode option in the sleep mode settings has been set to "on." In another embodiment, this can be performed by checking whether a specific time for beginning the sleep mode has arrived. This time can be specified in the sleep mode settings for the sleep mode application. In another embodiment, this can be performed by checking whether the cell phone has been docked in a docking station or is charging. In another embodiment, any one of these indications can initiate the sleep mode. If the sleep mode has been initiated by any one of these events, the sleep mode application will adjust the device to operate in the sleep mode according to the sleep mode settings (step 430). If the sleep mode has not been activated, the device will continue operating in the communication mode.

Figure 3:
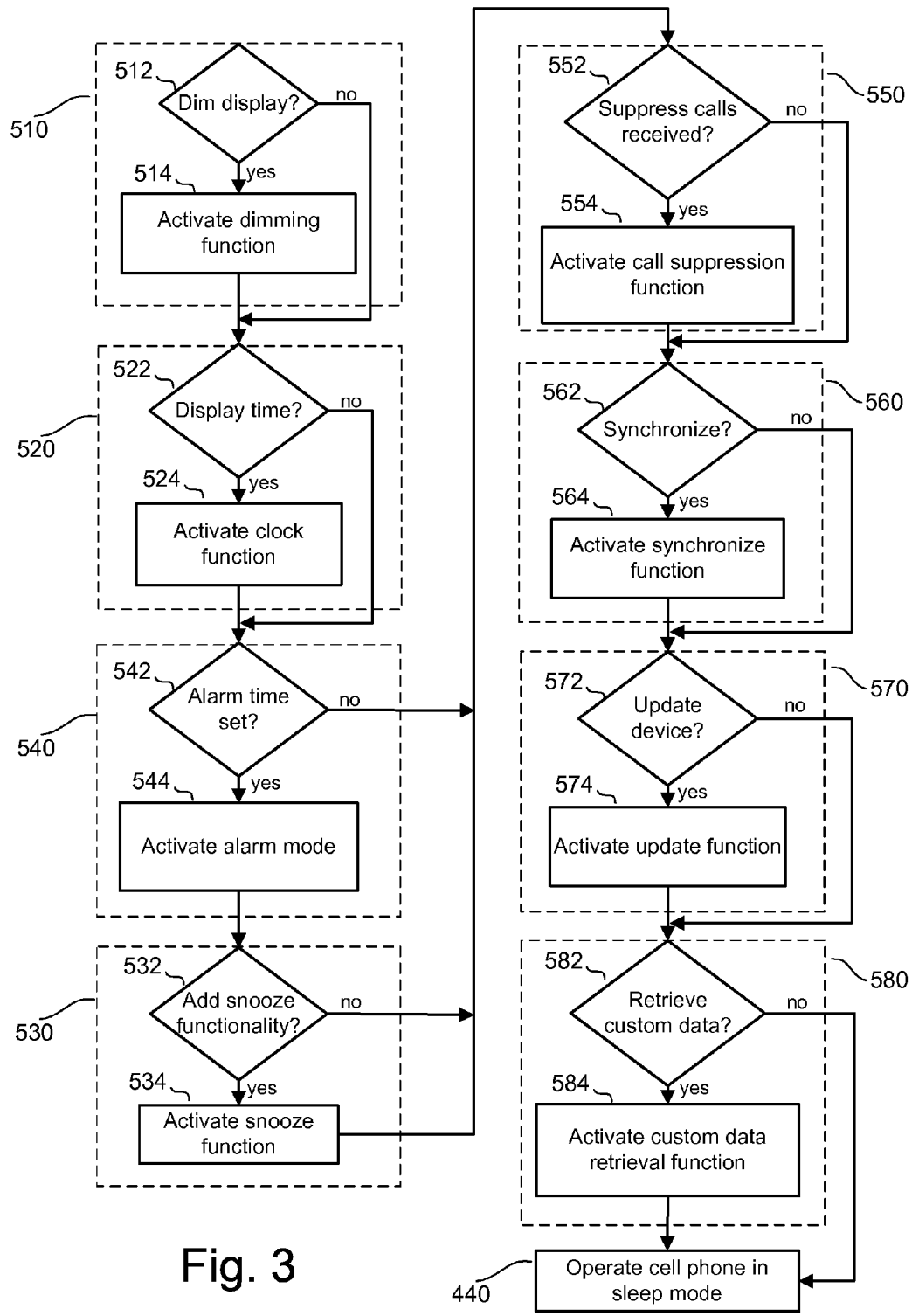
FIG. 3 is a flow chart for one process of transitioning a cell phone device to a sleep mode based on sleep mode user settings.

FIG. 3 describes a process of step 430 (FIG. 2) for adjusting the cell phone to operate in the sleep mode based on the sleep mode settings (e.g. set by a user or by default). FIG. 3 depicts different functions of the sleep mode and how they adjust the cell phone according to sleep mode settings. These functions include, but are not limited to, a dimming function 510, a clock function 520, an alarm mode 540, a snooze function 530, a call suppression function 550, a synchronization function 560, an update function 570, and a custom data retrieval function 580. The order of operation of these functions is not limited to the example shown in FIG. 3. Likewise, each of these functions can be performed simultaneously and/or any one of these functions can be omitted entirely from the process.

In the example depicted in FIG. 3, the dimming function 510 checks if there is a sleep mode setting that is set to dim the display of the cell phone when the cell phone operates in the sleep mode (step 512). In a cell phone operating in the communication mode, the user interface and operating system typically provide the user with the capability of setting the brightness intensity for the cell phone display. Usually, the communication mode will operate using the set brightness intensity for the cell phone display. During the communication mode, the cell phone may also turn off the display after a certain amount of time has passed in which the cell phone has been idle (i.e. not being used). In the sleep mode, if the sleep mode settings indicate that the cell phone display should be dimmed, the dimming function will be activated (step 514). This function dims the display of the cell phone. In one embodiment, the display is dimmed to a low-intensity lighting level (i.e. a sleep-mode light intensity). For example, the display lighting intensity could be dimmed to a sleep-mode level that is lower than the light intensity used during the communication mode. In one embodiment, the display lighting could be set at a particularly low sleep-mode lighting level, as to not keep the user awake but to still allow for reading of the display in a dark environment, for example.

Once the display is dimmed accordingly (step 514), or if there is no dimming setting specified, the clock function 520 checks if the sleep mode settings specify that the current time should be displayed (step 522). Normally, in the communication mode, the cell phone displays different types of information, such as a main screen for accessing different applications of the cell phone, for example. In the communication mode, the cell phone display may simply turn off after the phone has been idle for an amount of time. In the sleep mode, if the sleep mode settings specify that the current time should be displayed, the clock function will be activated (step 524). The clock function displays the current time on the cell phone display in a manner that is easily readable. For example, the time can be displayed in a manner that uses the majority of the display area, allowing the user to easily view the current time. Additionally, the low-level sleep-mode lighting that may be provided by the dimming function 510 also allows the time to be displayed in an easily readable format. However, the clock function is not limited to displaying the time in only this manner. The clock function may display a time using any amount of the display area.

Once the clock function 520 has adjusted the cell phone to display the time, or if no such setting was specified in the sleep mode settings, the alarm mode 540 checks if an alarm time has been set (step 542). Normally, in the communication mode, an alarm will sound at an alarm time if an alarm time is set. However, the communication mode typically does little more than that in the way of operating an alarm. In the sleep mode, if an alarm time is specified by the sleep mode user settings, the alarm mode is activated (step 544). The alarm mode keeps track of the current time so that an alarm can be provided to the user at the specified alarm time. In one implementation, the alarm mode can be set to provide different types of alerts to the user at the alarm time based on the sleep mode user settings. For example, the user can be alerted with a particular tone, a song, a voice recording, and the like.

If the alarm mode is activated (step 544), the snooze function 530 checks if snooze functionality settings are specified (step 532). Normally, in the communication mode, the hardware buttons are used for specific purposes, such as sending and/or ending a call, dialing, turning the phone on or off, and the like. In the sleep mode, if snooze functionality should be added to the cell phone, the snooze function will be activated (step 534). The snooze function 530 prepares at least a portion of the hardware buttons on the cell phone for conversion from their normal communication mode functions (e.g. dialing) to a snooze function when an alert is provided to the user. That is, a portion of the hardware buttons will be able to temporarily interrupt an alert that is provided to a user at the set alarm time. During the sleep mode, the portion of hardware buttons are prepared to operate as snooze buttons when an alert is provided. At the alarm time, the snooze function will convert the portion of the hardware buttons to function as snooze buttons until a specific alarm-off hardware button is pressed.

Once the snooze function 530 has prepared the hardware buttons for conversion to snooze buttons for the cell phone, or if no such setting for snooze functionality was specified, the call suppression function 550 checks if the sleep mode settings specify that calls and messages received during the sleep mode should be suppressed (step 552). Typically, in the communication mode, all calls and messages are received by notifying the user based on notification options set for the communication mode, such as setting the notification options so that the cell phone rings upon receipt of a call, for example. In the sleep mode, if calls and messages should be suppressed during the sleep mode, the call suppression function is activated (step 554). The call suppression function suppresses calls and messages received by changing the way the user is notified of the received calls and messages based on the sleep mode user settings. For example, in one embodiment, calls and messages can be suppressed by changing the notification tone for calls and messages so that there is no notification tone (i.e. silent ring tone) for calls and messages received while the cell phone is in the sleep mode. In one embodiment, certain calls can be sent to a specific voice message alerting the caller that the user is unavailable. In another embodiment, the calls that are suppressed can be sent directly to the user's voicemail. In another embodiment, calls and messages can be suppressed based on sender priority settings. For example, calls and messages received from a high-priority sender may be received with an audible notification, while calls and messages from others might be suppressed in any of the manners previously discussed for suppression. These priority settings could be specified in the sleep mode settings for the sleep mode application or in settings specified in another cell phone application (i.e. an address book application). Although different options for operating the suppression function of the sleep mode have been discussed, the options for suppression are not limited to those discussed and can include any variety or combination of suppression options.

Once the call suppression function is activated (step 554), or if no such setting was specified, the synchronization function 560 checks if a synchronization settings was specified (step 562). In the typical communication mode, synchronization normally occurs when the user specifies the cell phone should begin synchronization with another device. In the sleep mode, if the sleep mode settings indicate the cell phone should be synchronized with another device, the synchronization function is activated (step 564). The synchronization function synchronizes the cell phone's data (e.g. contacts, calendars, and the like.) with the data for a specified device. For example, the device that the cell phone should be synchronized with may be specified in the sleep mode settings for the sleep mode application or in settings specified in another cell phone application (i.e. a synchronization application). During the synchronization function, the cell phone can update its calendar, contacts, files, and the like to match the information contained in the specified device, or vice versa.

In one embodiment, the synchronization function occurs through wireless communication available through the cell phone. For example, synchronization can occur through Bluetooth communication with another device.

Once the synchronization function is activated (step 564), or if no such settings are specified, the update function 570 checks if an update setting was specified (step 572). In the normal communication mode, updates for the cell phone can be downloaded and/or installed manually. In the sleep mode, a check for updates can be performed each time the cell phone transitions to the sleep mode. If the sleep mode settings specify that the cell phone should check for updates, the update function is activated (step 574). The update function checks if there are any available updates for the cell phone. These updates can include, but are not limited to, software updates for applications, the cell phone operating system 110, and the like. In one embodiment, the cell phone can check for updates by accessing the cell phone's internet browser application. If any updates are found online, they can be downloaded and installed during the sleep mode.

In one embodiment, the cell phone can check for, download, and/or install updates through wireless communication available through the cell phone. For example, updates can be found through internet access provided through any type of RF communication means, as previously discussed (e.g. wi-fi).

Once the update function is activated 574, or if no such setting is specified, the custom data retrieval function 580 checks if a custom data setting was specified (step 582). In the normal communication mode, content can be obtained and/or refreshed when the user manually accesses the content. In the sleep mode, if the sleep mode settings specify that custom data should be retrieved and provided to the user at the alarm time, the custom data retrieval function is activated (step 584). The custom data retrieval function prepares the sleep mode application for retrieving the specified custom data by, for example, preparing the sleep mode application to receive a data feed according to the specified custom data. The custom data can be any data a user would like at the alarm time, such as new, traffic, weather, sports, email, stock information, and the like. The desired custom data may be specified in the sleep mode settings. Prior to the specified alarm time, the custom data retrieval function 580 refreshes the custom data by retrieving the specified data feed and provides the custom data to the user at the alarm time. Again, like the updating function 570, in one embodiment, the cell phone can access the specific custom data through wireless communication available through the cell phone.

Once the custom data retrieval function is activated (step 584), or if no such setting is specified, the cell phone operates in the sleep mode (step 440) according to the adjustments made by the sleep mode functions as described in FIG. 3.

Referring back to FIG. 2, while the cell phone is operating in the sleep mode (step 440), if the sleep mode settings specify that custom data should be retrieved and provided to the user at the alarm time, the custom data retrieval function 580 of the sleep mode application will check if the current time is some amount of time (n) prior to the set alarm time (step 450). In the example of FIG. 2, if the current time is not the alarm time minus (n) amount of time, the cell phone will continue to run in the sleep mode. If the current time is the alarm time minus (n) amount of time, the sleep mode application will retrieve the specified custom data (step 460) and continue to operate the cell phone in the sleep mode (step 470). The sleep mode application can retrieve the custom data at any amount of time prior to the set alarm time. In one embodiment, the sleep mode application retrieves the custom data immediately prior to the set alarm time to provide the user with the most current information at the alarm time.

In some embodiments, steps 450, 460, and 470 are omitted if, for example, there is no custom data to be provided to the user at the alarm time. For example, this would be the case if the user did not want custom data to be retrieved or if the cell phone was not enabled for receiving custom data. In such cases, the cell phone would operate in the sleep mode (step 440) and check to see if the current time is the same as the set alarm time (step 480).

In step 480, the sleep mode application will continue to run in the sleep mode if the current time has not yet reached an alarm time. If the current time has reached the set alarm time, an alert is provided to the user (step 490).

In step 492, the sleep mode application checks if a snooze button has been pressed. This occurs only if the snooze function 530 has been activated 534. If a snooze button has been pressed, the sleep mode application checks if the current time is the same as a snooze time (step 494). A snooze time can be any amount of time after a snooze button has been pressed. The snooze time can be a user-defined setting or a default setting in the sleep mode settings. In step 494, the sleep mode application will continue to check if the current time is the same as the snooze time. If the current time is the same as the snooze time, the sleep mode will provide an alert to the user (step 490).

If a snooze button has not been pressed, or if the snooze function 530 has not been activated, the sleep mode application will check if the alarm off button has been pressed (step 496). If the alarm off button has not been pressed, the user will continue to be alerted (step 490). If the alarm off button has been pressed, the sleep mode will end, and the cell phone 100 will begin operating in the cell phone mode (step 410).

In one embodiment, if custom data was retrieved in step 460, the custom data can be retrieved again at any time prior to the snooze time in step 494. At that time, the custom data can be provided to the user when the user is alerted again in step 490.

In one embodiment, if custom data was retrieved in step 460, that custom data will be provided to the user when the alert is provided to the user in step 490 by automatically displaying the custom data at the alarm time. In another embodiment, if custom data was retrieved in step 460, the custom data will be provided to the user at the alarm time through the internet browser for the cell phone. That is, the user can access the provided custom data by opening the internet browser. In yet another embodiment, if custom data was retrieved in step 460, the custom data will be provided to the user at the request of the user. For example, at the alarm time, the cell phone could display a prompt for the user to access the custom data.

Throughout the process of FIG. 2, the sleep mode can be interrupted or stopped by manually turning off the sleep mode, undocking the cell phone device, or the like.

FIG. 4A shows an example of a cell phone 600 operating in a communication mode, as described in step 410 of FIG. 2. The cell phone display 610 may display menu options for the cell phone's applications. The hardware buttons 620 may be used to operate the cell phone's functions.

FIG. 4B shows an example of a cell phone 600 operating in a sleep mode. The display 610 shows the current time 615 displayed in an easily readable format, in that the time 615 is displayed over the majority of the display area (i.e. clock function 520). Additionally, the display lighting could be dimmed based on the specified sleep mode settings for the dimming function 510. The hardware buttons 620 on the cell phone 600 can function as snooze buttons according to the sleep mode settings specified for the snooze function 530.

FIG. 5 shows an example of the cell phone 600 docked in a docking station 700. In one embodiment, the docking station 700 charges the cell phone 600. In one embodiment, the docking station 700 can display the time 710 in a an easily readable format as well. Additionally, the docking station can have its own snooze hardware button 720 and alarm-off hardware button 730.

Instead of using communication means available on the cell phone for performing functions like synchronizing cell phone data with another device, updating the cell phone, or retrieving custom data for the user, the antenna 740 on the docking station can provide the same communication means that would be available on the cell phone (e.g. Bluetooth, wi-fi, and the like.) In one embodiment, the communication means on the docking station 700 can be wireless. In another embodiment, instead of the antenna 740, the docking station 700 can be connected directly to, for example, a LAN line.

As previously described, in one embodiment, the sleep mode application can be initiated upon docking the cell phone 600 in the docking station 700 (step 410 of FIG. 2).

FIG. 6 depicts an example user interface for adjusting sleep mode settings that can be stored within the preferences and default settings for the sleep mode application. However, a user interface for the sleep mode application can include more or fewer setting options than shown in FIG. 6. Additionally, as previously discussed, in some embodiments, the setting options in the example could be default settings that are preset and/or unavailable for adjustment by the user.

In the example of FIG. 6, the sleep mode can be initiated by setting the "Set Sleep Mode" option 310 to "on." In another embodiment, the user can set a specific time for the sleep mode to begin. In yet another embodiment, the sleep mode can be automatically initiated when the cell phone begins charging the battery or when the cell phone is docked in a docking station. Additionally, in some embodiments, any one of these indications could initiate the sleep mode.

The user interface 210 of FIG. 6 also allows a user to set an alarm time 320 at which a user would like to be alerted and an alarm tone 330 for the alert. Additionally, calls and messages received by the cell phone can be suppressed 340. Updates for the cell phone's software, such as the cell phone's operating system or applications, can be downloaded and/or installed 350. The cell phone can be synchronized to another specified device 360 so that data, such as contacts and calendars, on the specified device can be synchronized with the data on the cell phone. Custom data, such as news, weather, traffic, email, stock information, sports, and the like, can be retrieved and provided to the user at the alarm time 370. Again, embodiments for a user interface for the sleep mode application are not limited to the example shown in FIG. 6.

FIG. 7 shows an example user interface 800 providing custom data retrieved (step 460 of FIG. 2) based on the sleep mode settings specified in FIG. 3. In one embodiment, the weather 810, news 820, and stock information 830 are provided to the user at the alarm time specified by the sleep mode user settings. In certain embodiments, as previously described, the custom data can be provided automatically to the user at the alarm time, the custom data can be provided through the cell phone's internet browser, or the user can request the custom data at or after the alarm time. However, the manner in which the custom data is provided to the user is not limited to those discussed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for operating a cell phone device in a sleep mode, said cell phone device having a screen display providing a communication-mode display at a first light intensity when said cell phone device is in a communication mode and input control hardware controlling communication functions in said communication mode, the sleep mode method comprising:
   rendering a sleep-mode display on the cell phone at a sleep-mode light intensity, said sleep-mode display including a time display occupying a majority of an area of said screen display during the sleep mode, said sleep-mode light intensity being dimmer than said first light intensity, the time display occupying a minority of the area in said communication mode;
   alerting a user with an alarm at an alarm time specified in sleep-mode user settings;
   suppressing at least a portion of call and at least a portion of message notifications; and
   interrupting said communication functions of at least a portion of said input control hardware when said user is alerted during said alerting, said interrupting temporarily reassigning the functionality of at least a portion of the input control hardware and allowing said user to suspend said alarm using said portion of said input control hardware.

2. The method according to claim 1, wherein:
   said sleep-mode user settings specify user preferences for operating said cell phone device in said sleep mode, the user preferences including an alarm time setting, a data synchronization activation function, a custom data retrieval function, and a device update function.

3. The method according to claim 1, wherein:
   said sleep mode is enabled by one of: a sleep-mode time indicated in said sleep-mode user settings, manual initiation by said user, or docking said cell phone device in a docking station.

4. The method according to claim 1, wherein:
   said step of suppressing at least a portion of call and message notifications is based on user defined priority call settings.

5. The method according to claim 1, further comprising:
   updating software for said cell phone device including downloading and installing software updates for said cell phone device during said sleep mode prior to said alerting step.

6. The method according to claim 5, wherein:
   said updating occurs through internet access provided through said cell phone device.

7. The method according to claim 5, wherein:
   said cell phone device is docked in a docking station; and
   said updating occurs through internet access provided through said docking station.

8. The method according to claim 1, further comprising:
   synchronizing cell phone data stored on said cell phone device with device data stored on another device.

9. The method according to claim 8, wherein:
   said synchronizing occurs through wireless communication provided through said cell phone device.

10. The method according to claim 8, wherein:
    said cell phone device is docked in a docking station; and said synchronizing occurs through wireless communication provided through said docking station.

11. The method according to claim 1, further comprising:
retrieving custom data specified by said user, said custom data includes at least one of: weather, traffic, stock information, news, email, or sports; and
providing said custom data to said user when said alarm is provided.

12. A method for operating a cell phone device in a sleep mode, the cell phone device having a communication mode and input control hardware controlling communication functions in said communication mode, comprising:
dimming a cell phone display of said cell phone device so that said display is readable in a dark environment;
rendering a time display on a majority of an area of said cell phone display during said sleep mode, the time display occupying a minority of the area of said cell phone display during said communication mode;
checking for software updates for said cell phone device during said sleep mode and downloading and installing software updates for said device during said sleep mode;
receiving a specified alarm time via the input control hardware;
activating an alarm mode for said cell phone device, the alarm mode sounding an alarm that alerts a user with an alarm at the alarm time specified;
activating a snooze function during the alarm mode, the snooze function interrupting said communication functions of at least a portion of input control hardware on said cell phone and temporarily reassigning the functionality of at least a portion of the input control hardware to convert said portion of input control hardware to function as snooze buttons when said alarm alerts said user at the alarm time specified, said activating said snooze function allowing said user to temporarily turn off said alarm using said portion of said input control hardware; and
suppressing at least a portion of call and at least a portion of message notifications.

13. The method according to claim 12, wherein ending the alarm returns the cell phone to a communication mode.

14. The method according to claim 12, wherein:
said sleep mode is enabled by one of: a sleep-mode time indicated in said sleep-mode user settings, manual initiation by said user, or docking said cell phone device in a docking station.

15. The method according to claim 12, further comprising:
synchronizing cell phone data stored on said cell phone device with device data stored on another device.

16. The method according to claim 12, further comprising:
preparing said cell phone device to retrieve custom data specified by said user, said custom data includes at least one of: weather, traffic, stock information, news, email, or sports;
retrieving said custom data; and
providing said custom data to said user at said alarm time set by said user.

17. A cell phone including a display, input/output hardware, a processor and memory, said cell phone including a communication mode and input/output hardware controlling communication functions in said communication mode for sending and receiving communications and processor readable code including instructions for performing steps comprising:
dimming said display to a brightness less than a communication mode brightness;
rendering a time display on a majority of an area of said display during a sleep mode, and a minority of said area during the communication mode;
downloading and installing software updates for said device during said sleep mode;
alerting a user with an alarm at an alarm time specified by said user;
interrupting said input/output hardware controlling communication functions of at least a portion of said input/output hardware by temporarily reassigning the functionality of at least a portion of the input control hardware to convert said portion of said input/output hardware to function as snooze buttons when said user is alerted at the alarm time specified and allowing said user to temporarily turn off said alarm using said portion of said input/output hardware;
suppressing at least a portion of call and message notifications during said sleep mode;
synchronizing cell phone data stored on said cell phone with device data stored on another device; and
retrieving custom data specified by said user and providing said custom data to said user at said alarm time.

18. The apparatus according to claim 17, wherein:
said synchronizing occurs through wireless communication provided by said cell phone.

19. The apparatus according to claim 17, wherein:
said cell phone is docked in a docking station; and
said synchronizing occurs through wireless communication provided by said docking station.

* * * * *